*United States Patent* [19]

Ferris et al.

[11] Patent Number: 5,937,418
[45] Date of Patent: Aug. 10, 1999

[54] AUTOMATIC WIRE COPY DATA FEED DISTRIBUTION SYSTEM

[75] Inventors: Robert A. Ferris, Huntington Station; George Alexander Holt, III, Hartsdale, both of N.Y.

[73] Assignee: ICon CMT Corp., Weehawken, N.J.

[21] Appl. No.: 08/886,382

[22] Filed: Jul. 1, 1997

[51] Int. Cl.$^6$ .................................................. G06F 17/30
[52] U.S. Cl. ...................................... 707/513; 395/200.36
[58] Field of Search ............................... 395/200.36, 500; 707/501, 513, 3, 527; 364/280.4, 280.6, 282.4

[56] References Cited

U.S. PATENT DOCUMENTS 5,530,852 6/1996 Meske, Jr. et al. ................. 395/200.36
5,537,526 7/1996 Anderson et al. ...................... 707/515
5,537,586 7/1996 Amram et al. .............................. 707/3

*Primary Examiner*—Joseph H. Field
*Assistant Examiner*—John L. Young
*Attorney, Agent, or Firm*—Marshall, O'Toole, Gerstein, Murray & Borun

[57] ABSTRACT

A system for presenting updated content on a networked computer receives communications such as those sent by a wire copy service. The system processes the communications, organizes the communications by subject matter, and creates title or summary files. If the communications relate only to parts of stories, those communications are assembled together in a file identified by a subject identifier of the story. When a user of the system requests content, the system calls a template, which provides the format for transmitting the content. The template calls an appropriate file and inserts that file into the template to create a page. The page is then transmitted to the user. The templates may also automatically create hyperlinks in order to call up other files of content as requested by a user.

10 Claims, 6 Drawing Sheets

AUTOMATIC WIRE COPY DATA FEED DISTRIBUTION SYSTEM

FIELD OF THE INVENTION

The present invention relates generally to distribution of data over a computer network, and more particularly to distribution of wire copy stories over a network and formatting of those stories for display.

BACKGROUND OF THE INVENTION

Over the last several years, the World Wide Web has grown rapidly with an ever-increasing number of users and web sites offering a variety of content to those users. The growth in web sites has lead to competition among those sites for visits by the various users. Recently, web sites have begun to include advertising in the web pages, which has further increased the competition to attract users.

In order to attract users, operators of web sites have employed a number of strategies, primarily involving updating or changing the content, or incorporating appealing designs and appealing content. Updating or changing the content on a web site is desirable because new material tends to attract return visits by users. If the content is not updated, a user would have little incentive for returning to most web sites once the user has viewed all of the content.

Updating or changing a web site, however, may be extremely expensive. First, there is a large "editing" cost in determining what new content to add. Generally, an individual must read through a variety of "stories" or ideas for stories in order to determine which ones should be added to the web site. Once the new content has been selected, it must then be typed in and formatted, usually using Hypertext Mark-Up Language (HTML) in order for the content to be used on the system. If cross-referencing of the content is desired, hyperlinks must be created, which adds to the expense of incorporating the new material.

SUMMARY OF THE INVENTION

In accordance with one aspect of the present invention, a method for presenting updated content on a networked computer includes obtaining a feed of data and converting that data to data files. A first template is called, which includes instructions for calling a first data file. The first data file is inserted into the template to create a first page, and the first page is transmitted.

The first page may be transmitted to a client computer from a server computer. The template may include instructions for the client computer to periodically request updates of content from the server computer.

Where the first data file is a title file, the template includes instructions for creating hyperlinks using each title in the title file as anchor text for corresponding hyperlinks. A second template may be called when anchor text in the first page is selected by a user. A second page is created by inserting a second file into the second template, where the second file is chosen according to the story identifier of the title of that anchor text. The second page may then be displayed.

An apparatus may be provided for performing the method of the present invention, and instructions for performing that method may be stored on a computer-readable storage device.

In accordance with another aspect of the present invention, a method of presenting updated content includes obtaining a wire copy feed, where the feed includes a series of communications and each communication includes a story identifier. The wire copy feed is converted into data files, where all headlines in the communications are stored in a headline file, and all communications having a particular story identifier are stored in a corresponding story file. A first template is called when a request for content is received, where the first template includes instructions for inserting the headline file into the template to create a first page, and includes instructions for creating hyperlinks using the headline as anchor text. The first page is displayed, and a second template is called when anchor text in the first page is selected by a user. The second template includes instructions for calling a story file corresponding to the story identifier of the headline in the anchor text. A second page is created based on the template and the called story file, and the second page is displayed.

Other features and advantages are inherent in the method and apparatus claimed and disclosed or will be apparent to those skilled in the art from the following detailed description in conjunction with the accompanying drawings.

DETAILED DESCRIPTION OF THE PREFERRED EMBODIMENT

Figure 1:
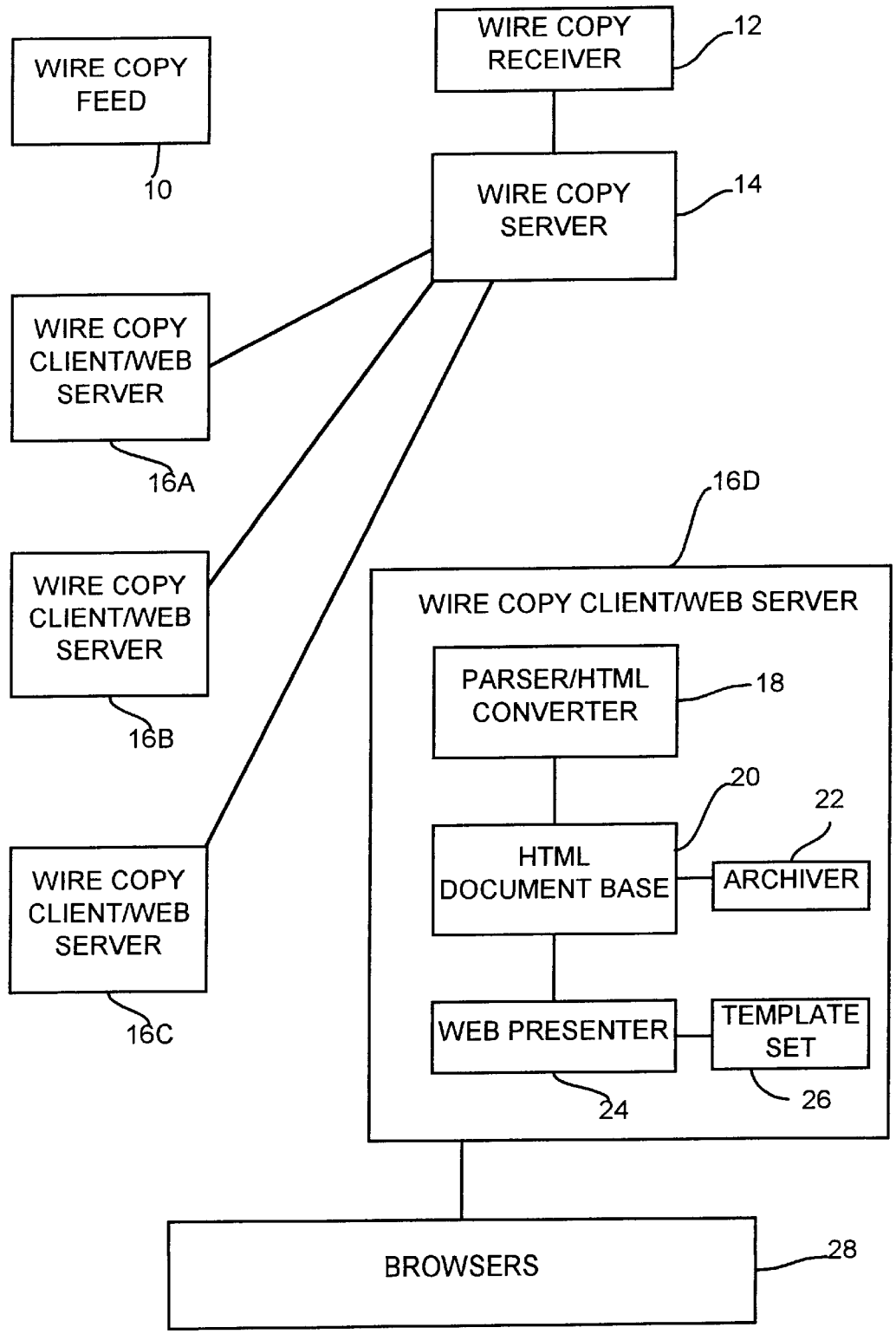
FIG. 1 is a block diagram of an embodiment of an automatic wire copy data feed distribution system of the present invention.

Referring initially to FIG. 1, a first embodiment of the present invention includes a wire copy feed 10, which transmits a series of communications to a wire copy receiver 12. The wire copy feed 10 may originate from any one of a variety of sources such as Reuters or Associated Press. The transmission of signals between the wire copy feed 10 and the wire copy receiver 12 may be accomplished in a variety of ways, such as over telephone lines, via satellite, etc. Numerous wire copy receivers 12 are available, including a Model 1023, manufactured by Wave 4. The wire copy receiver 12 is connected to a wire copy server 14. The wire copy server 14 is a computer which is connected, either directly or indirectly, to several wire copy client/web servers 16A, 16B, 16C, and 16D. Numerous computer systems, including a Sun SparcStation with a Solaris operating system may be used as the wire copy server 14 or the web server 16A–16D.

Although all of the web servers 16A–16D are essentially identical, only web server 16D is shown in detail. Each web server 16 includes a parser/HTML converter 18, which creates an HTML document base 20 from the communications received by the wire copy receiver 12. The HTML document base 20 is periodically reorganized by an archiver 22 based on the time of day. A web presenter 24 has access to the HTML document base and uses templates 26 in order to present information received in the wire copy feed communications to browsers 28, which are connected through the Internet or an intranet to the various web servers 16A–16D. It should be understood that the use of browser software is not necessary to the present invention, but will be useful to most users for obtaining information. Moreover, the system need not be used over a wide area network such as the Internet, but can instead be used over smaller networks or intranets. The operation of the parser 18, archiver 22, and web presenter 24, as well as the construction of the HTML document base 20, are described below.

Figure 2:
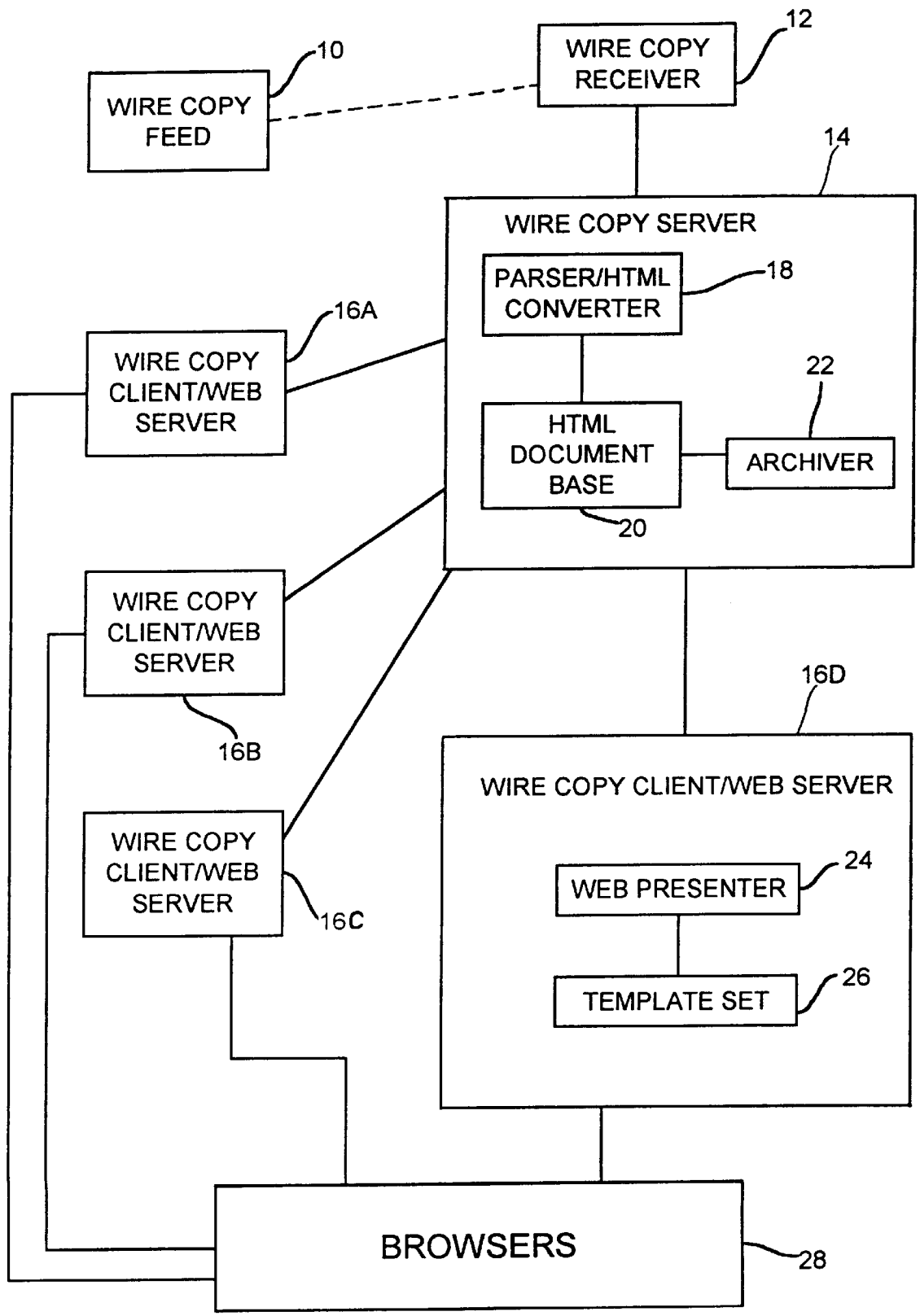
FIG. 2 is another embodiment of an automatic wire copy data feed distribution system of the present invention.

FIG. 2 depicts a second embodiment of a system of the present invention where some of the functions performed by the web server 16 of FIG. 1 are performed by the wire copy server 14. In the system depicted in FIG. 2, the parser/HTML converter 18, the HTML document base 20, and the archiver 22 are all contained in the wire copy server 14. The wire copy client/web servers 16 of FIG. 2 each include a web presenter 24 and a template set 26 (see 16D). Under the system of FIG. 2, the web servers 16A-D each have access to all or part of the HTML document base 20 contained on the wire copy server 14. If, for instance, wire copy client/web server 16A relates only to sports, it may only have access to sports-related documents in the HTML document base 20.

FIGS. 1 and 2 are only two examples of the distribution of the functional modules and files of a system of the present invention. Other arrangements of the modules and files among the various components of hardware may be provided without deporting from the present invention.

Figure 3:
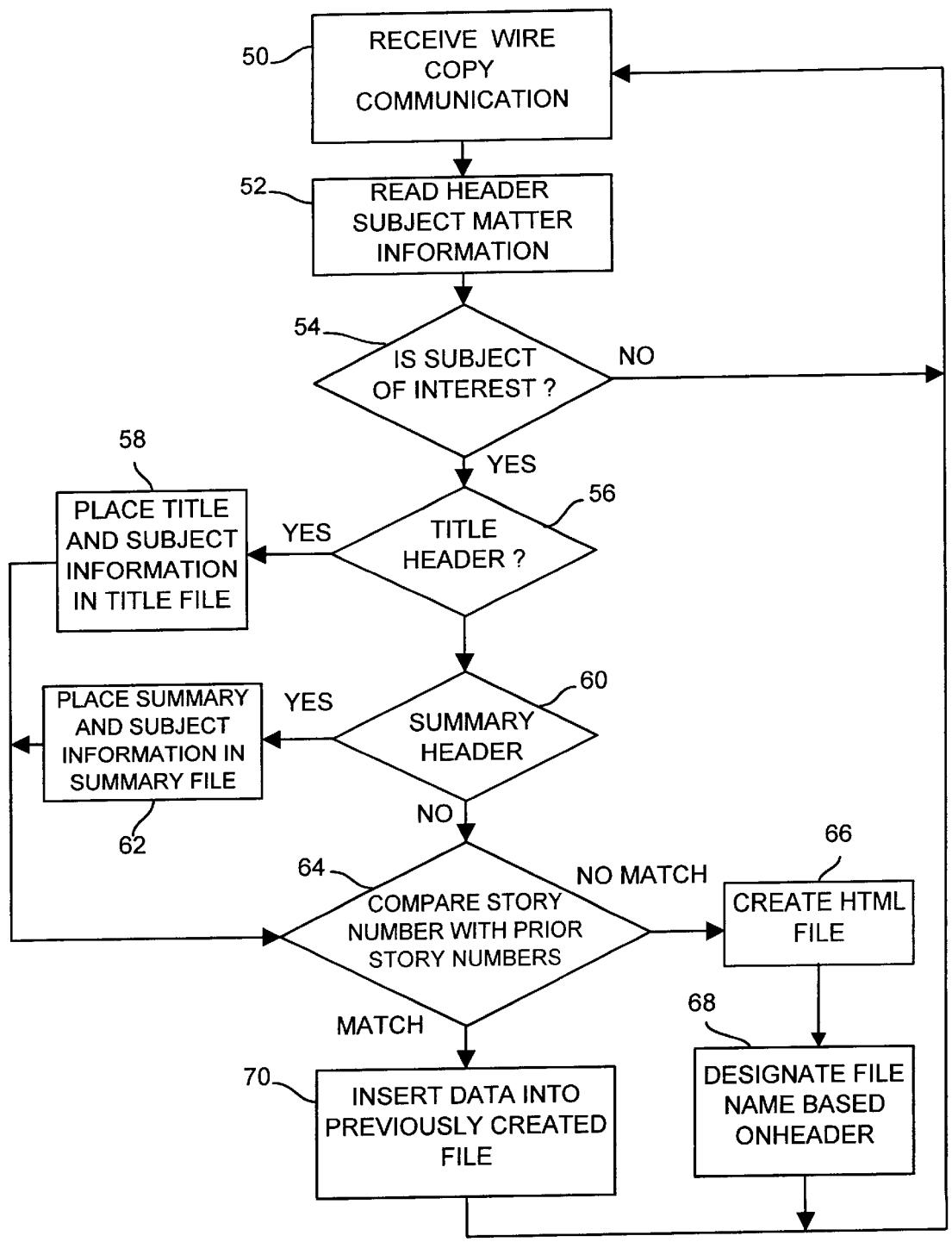
FIG. 3 is a flow chart of the parser of the system of the present invention.

Referring now to FIG. 3, the operation of the parser 18 begins at block 50 with the receipt of a wire copy communication. Wire copy communications are generally in American Newspaper Association (ANPA) format when they are transmitted from the wire copy service. ANPA format includes a header with each communication, and then the body of the communication itself. A complete story is usually not transmitted fully in one communication, but it is instead broken up into as many as nine separate communications. Moreover, those nine communications need not be sent in order, and may be interspersed with communications relating to other stories. Each of the various communications may also be updated or withdrawn. Therefore, each ANPA communication includes a unique story number and an indication, e.g. "one of nine," of which part of the identified story is included in the communication. Since all communications relating to a particular story have the same story number and each communication includes a header identifying the portion of the story to which the communication pertains, the separate communications can be assembled together into a complete story.

Each ANPA communication also includes subject matter information, usually in the format of a selector code and a slug. Selector codes are abbreviations for various topics such as business (BU), politics (PO), entertainment (ET), sports (SP), etc. The slug is a short description of the story within the topic identified by the selector code. For instance, the subject matter information in a header of a particular communication might be:

"BU/Stock Market Crash"

where "BU" is the selector code for business, and "Stock Market Crash" is the slug. On any given day, the selector code/slug for a story will be unique to that story and common to all communication for the nine segments of the story. The selector code/slug can, therefore, be used to identify and assemble the story just as the story number is used, and may also be used to categorize stories by subject matter.

After receiving the communication, control then passes to block 52 where the parser 18 reads the header subject matter information. At block 54, the system determines whether the subject in the header is of interest. For instance, if the operator of the system is only interested in displaying information regarding sports, any communication which has a selector code other than "SP" for sports, would not be of interest. If the subject is not of interest, the system discards the communication and returns to block 50 to receive another communication.

At block 56, the system determines whether the header of the communication indicates that it includes a title, which in the case of ANPA communications, would be a headline. Since the title or headline is the first part of the story, it is always identified as "one of nine." If the header of the communication indicates that that communication includes a title, control passes to block 58 where the title, i.e. the text of the communication, is placed into a title file. The system may create many title files, each organized by story subject. In such a case, the system must determine the subject of the story, possibly using the selector code, and place the title in the appropriate title file. For instance, if the system is interested in sports and business, all of the sports titles may be placed into a sports title file, and all of the business titles may be placed into a business title file. Along with that text, a subject identifier for the story to which the title pertains (in ANPA format, the selector code and slug) is placed in the title file and correlated with its corresponding title.

If the communication does not have a header indicating that it includes a title, control passes to block 60 to determine whether the communication includes a story summary. In ANPA format, the summary is the second segment of a story, and is therefore identified as "two of nine." The summary may also be separate from the nine story communications and will therefore be separately identified as such, but correlated with the story identifier. If the communication includes a summary, the summary is placed into a summary file or subject-specific summary file at block 62. Along with the summary, a subject identifier for the story relating to that summary is also placed in the summary file and correlated with its corresponding summary.

After determining whether the communication includes a title or a summary, control passes to block 64 in order to compare the story number of the current communication with story numbers from previously received communications. If there is no match, meaning that story number had not been previously received by the system, control passes to block 66 where the system creates an HTML file. The text of the current communication, whether it be a title, a summary, or portions of the body of the story, is inserted into that HTML file. The system also performs minor formatting functions, such as insuring that tables or graphs are stored in the file in an appropriate manner.

Control then passes to block 68 where the filename of the newly created file is designated based on the header of the communication. In the example given above, a communication has a subject identifier "BU/Stock Market Crashes." The filename for the story identified by the subject identifier will be "BU/Stock Market Crashes." After naming the new file, the system then returns to block 50 to receive other wire copy communications.

If, at block 64, the system compares the story number of the present communication with those previously received and finds a match, the present communication is inserted at block 70 into the file previously created for that story number. The system uses the information in the header, e.g. "three of nine," in order to determine where in the file the present communication should be inserted. After inserting the present communication into the file, the system returns to block 50 to receive another communication.

It should be noted that although the system is shown for use with a wire copy feed in ANPA format, other types of data feeds can be used with the present invention. ANPA data feeds are particularly suitable because they have a header which provides subject matter information and allows for easy assembly of stories from separate communications, each consisting of a story segment. If another type of data feed is used, which does not include subject identifiers, the system could create those identifiers. Creating subject identifiers might be accomplished by reviewing the text and looking for certain key words. Moreover, if titles and/or summaries are not available in the data feed, the system can create them using the beginning of the text, the first lines of each paragraph, etc.

Figure 4:
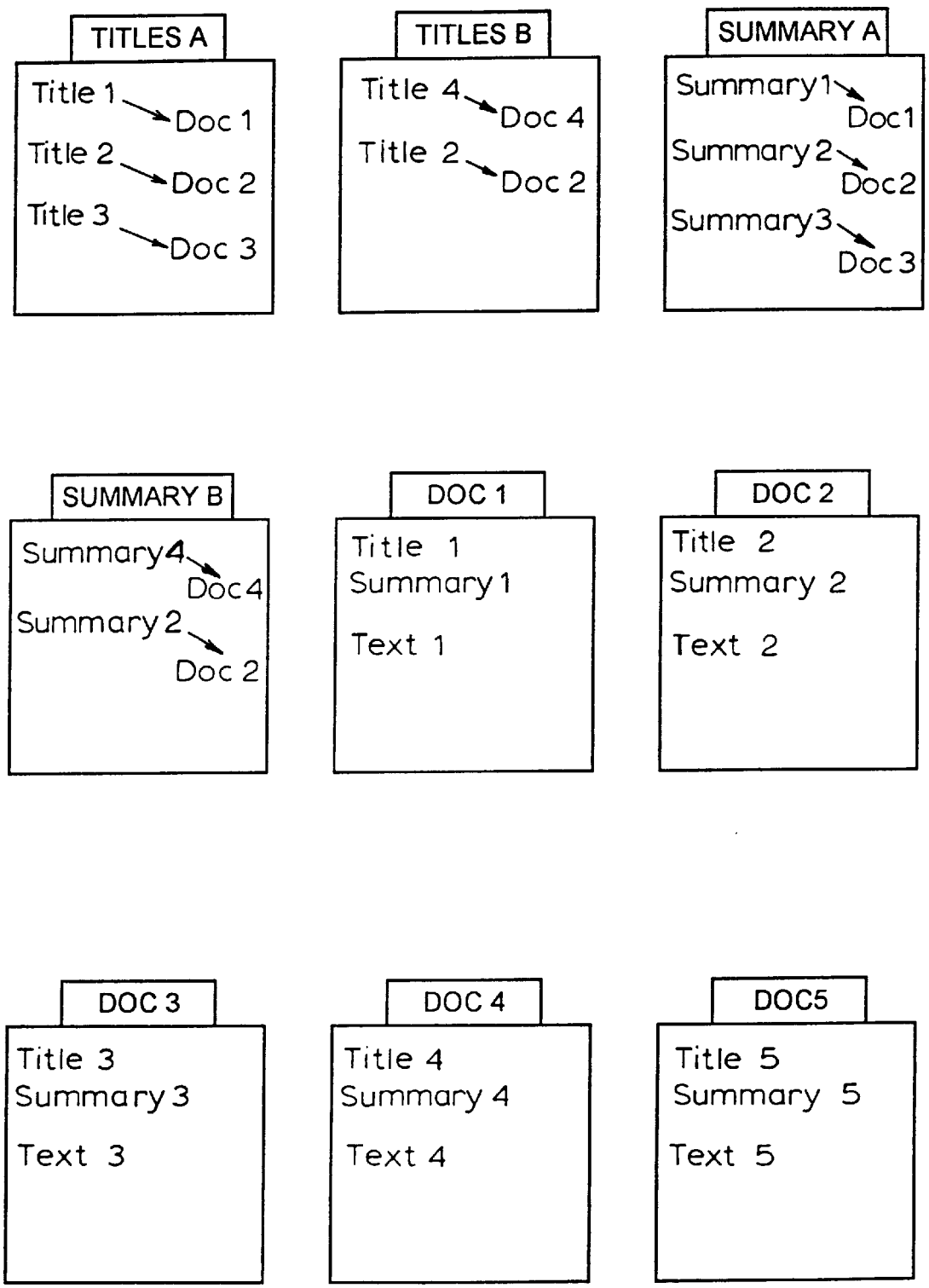
FIG. 4 is a block diagram representing files created by the parser of FIG. 3.

FIG. 4 depicts a diagram of a simplified file system created by the parser of FIG. 3. The database shown contains two title files, Titles A and Titles B, which relate to different subject matters. File Titles A contains entries for Title 1, Title 2, and Title 3. File Titles B includes entries for Title 4 and Title 2. Titles A and Titles B relate to different subject matters, and therefore have different entries, except that Title 2, which relates to the subject matter of both files, is contained in both files. As indicated by the arrows, each entry for a title is indexed or stored with a file address for the file containing the story which includes the corresponding title. For instance, in file Titles A, the title Title 1 is indexed with the address Doc. 1. The database also includes files Summary A and Summary B, which includes summaries for various stories and are indexed with the address of the file containing the corresponding story.

The database also includes files of stories having addresses of filenames Doc. 1, Doc. 2, Doc. 3, Doc. 4, and Doc. 5. Each document file includes the title, the summary, and the text of the corresponding story. The titles of each file, e.g. "Doc. 1," may be chosen based on a subject identifier in the header of a communication as shown in block 68 of FIG. 3.

Figure 5:
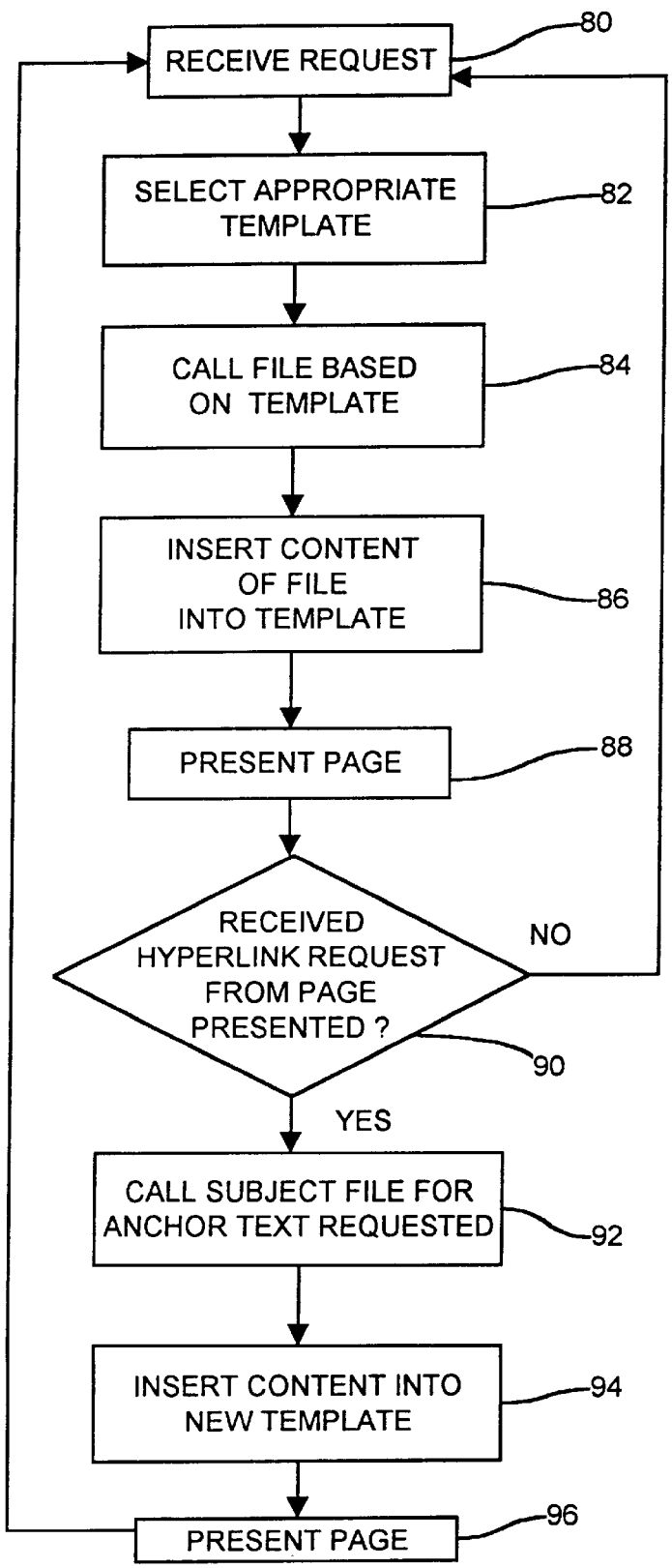
FIG. 5 is a flow chart of the presenter of the system of the present invention.

Once the files, as shown in FIG. 4, have been created, the presenter 24 (FIGS. 1 and 2) operates in accordance with the flow chart of FIG. 5. At block 80, the system receives a request for information, which in the case of a server on the World Wide Web will be received from a browser.

Control next passes to block 82 where the system selects an appropriate template based on the request received. A template is a style sheet written, for instance, in HTML, into which documents or data files are inserted for a stylized presentation by the presenter. The presenter may be a common Gateway Interface (CGI) program which inserts the database documents into templates or merges templates with database documents. The database documents are selected based on predefined tags which are part of the templates. The document from the database is positioned in place of the tag and the result presented as a finished product.

After an appropriate template has been selected, control passes to block 84 where a data file is called based on commands or tags in the template. For instance, if a user requests information on the types of business stories which are available, the template will call a business title file which lists the titles of all of the business stories available. Control next passes to block 86 where the content of the called file is "inserted" into the template. Inserting the file into the template means that the content of the file is placed into a page in the format required by the template. At block 88, the page is then presented, which in the case of the World Wide Web, means transmitting that page to the user.

When a title file or summary file as shown in FIG. 4 is inserted into the template, the system has the ability to create hyperlinks to the stories of the titles or summaries listed in those files. When file Title A is inserted into a first template, a page is created in which the words "Title 1" are displayed and highlighted or underlined to indicate that those words are the anchor text of a hyperlink. As seen in FIG. 4, the system also stores the address of the story, in this case "Doc. 1," to which the title pertains. Once an initial page, such as a title or summary page, has been presented, control passes to block 90 to receive another request from a user. If a new request is not a hyperlink request from the page presented, control returns to block 80.

The use of the title and summary files can be varied according to a website developer's instructions. For instance, when a title file is displayed to a user, selecting a title may cause a link to the story having that title, or may link to the summary file. After linking to the summary file, selecting a summary may then link to the story.

If the user sends a request in the form of a selected hyperlink from the presented page, control passes to block 92 in order to call the subject file relating to the anchor text requested. Thus, if a user has selected or "clicked-on" the word "Title 1" when the first page was presented, the system would call the file Doc. 1. Control next passes to block 94 where the content of the called file is inserted into a second template. The template used in block 94 is similar to the template called in block 82 and may include instructions for formatting and how the called file should be inserted into the template. Normally, the templates used with title files are different than the templates used with complete story files, but a single template suitable for use with all types of data files could be provided. After inserting the file into the template, the page is created and control passes to block 96 in order to present the page.

It may be desirable to transmit a page which will automatically be updated with then current stories or parts of stories. Thus, the template may include a program or set of instructions, such as a Java applet, which runs continuously on a browser/web client while a particular page is being viewed or is active on the web client. The program instructs the web client to periodically request updated information, if available, from the web server. The updated information may include stories, titles, summaries, hyperlinks, or any other information which might be transmitted as part of a page.

Figure 6:
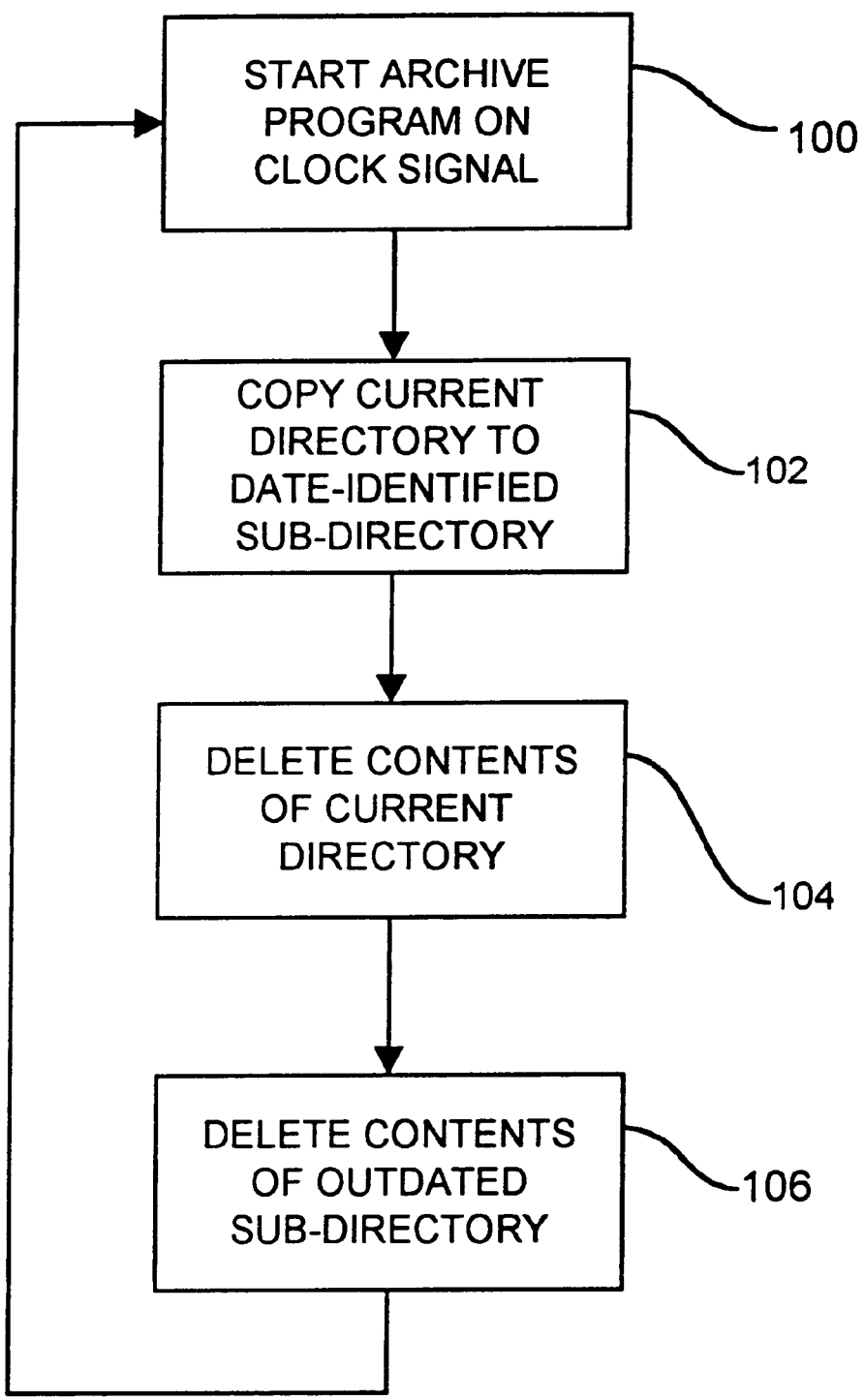
FIG. 6 is a flow chart of the archiver of the present invention.

FIG. 6 describes the archiver of the system of the present invention, which is initiated at block 100 on a clock signal. Clock signals can be provided in a variety of ways using a computer's chronograph facility. The choice of when to archive is left to the system operator, but will generally occur once every twenty-four hours, usually in the middle of the night. Upon initiation of the clock signal, control passes to block 102 where the current directory of data files is copied to a date-identified sub-directory. As the parser (FIG. 3) creates files, for instance, at block 58, block 62, and block 66, those files are placed in the system's current directory. Thus, all files in the current directory will relate to stories, titles, or summaries which were received by the system within the same period (generally the last twenty-four hours). When all such files have been copied to a sub-directory, the sub-directory is provided with an identifier of the time period from which those files were received by the system.

Control next passes to block 104 where the contents of the current directory are deleted from the current directory.

Thus, when the system returns to its parsing mode, any new information placed in the current directory will have been received by the system during the then current period.

Control next passes to block 106 where the contents of an outdated sub-directory are deleted. The operator of the system has the option of choosing the age of stories which may be presented to the user. For instance, it may be decided that any story more than seven days old should not be kept on the system. Thus, if the archiver has run at 12:01 a.m. on Monday morning, the information in the system from the previous day, Sunday, will be been moved to a date-identified sub-directory. Information from the previous Sunday, in its own date-identified sub-directory, would then be deleted at block 106.

The system of the present invention has numerous advantages over other systems. By creating each page dynamically, i.e. when it is requested, using templates, a format for the page can be prescribed while automatically changing the content in that page. Because content is added to the system on a continuous basis, users have incentive to return to the web site. The system also minimizes the amount of memory needed by only storing templates and data files rather than complete fully formatted pages. Traditionally, the updating of pages with dynamic content is accomplished by custom programming. The system of the presentation permits an "HTML editor" to accomplish in minutes what would normally take many hours of programming, testing, and implementation.

By storing information from previous days, a system operator has flexibility in deciding the age of information which may be presented to users. For instance, a system may have eight days of material archived (seven days in sub-directories plus the current directory). When a title file or summary file is presented, that title or summary file may include titles or summaries for a single day's stories, or titles or summaries for all or a portion of the time period which has been archived.

The foregoing detailed description has been given for clearness of understanding only, and no unnecessary limitations should be understood therefrom, as modifications would be obvious to those skilled in the art.

We claim:

1. A method for presenting updated content on a networked computer, the process comprising:

obtaining a first plurality of separate communications relating to a first story interspersed with a second plurality of separate communications relating to a second story, each communication including a unique story identifier and a portion identifier;

assembling the first plurality of separate communications into a complete story based on the unique story identifiers and portion identifiers;

converting the complete story to data files based on the portion identifiers;

calling a first template, wherein the first template comprises instructions for calling a first data file;

inserting the first data file into the template to create a first page; and transmitting the first page.

2. The method of claim 1 wherein:

the page is transmitted to a client computer from a server computer;

the template includes instructions for the client computer to periodically request updates of content from the server computer.

3. The method of claim 1 wherein:

the first data file is a title file; and the first template includes instructions for creating hyperlinks using each title in the title file as anchor text for corresponding hyperlinks.

4. The method of claim 3 comprising:

calling a second template when anchor text in the first page is selected by a user;

creating a second page by inserting a second file into the second template, wherein the second file is chosen according to a story identifier of the title of that anchor text; and displaying the second page.

5. The method of claim 1 wherein:

the first plurality of separate communications includes summaries; and the summaries are placed in a summary file.

6. An apparatus comprising means for performing the method of claim 1.

7. A computer-readable storage device comprising instructions for performing the method of claim 1.

8. A method for presenting updated content, the process comprising:

obtaining a wire copy feed wherein the feed comprises a series of separate communications and each communication includes a story identifier and a portion identifier;

converting the wire copy feed into data files wherein based on the portion identifier all headlines in the communications are stored in a headline file and all communications having a particular story identifier are stored in a corresponding story file;

calling a first template when a request for content is received, wherein the first template comprises instructions for inserting the headline file into the template to create a first page and instructions for creating hyperlinks using the headline as anchor text;

displaying the first page;

calling a second template when anchor text in the first page is selected by a user wherein, the second template comprises instructions for calling a story file corresponding to the story identifier of the headline in the anchor text;

creating a second page based on the template and the called story file; and displaying the second page.

9. An apparatus comprising means for performing the method of claim 8.

10. A computer-readable storage device comprising instructions for performing the method of claim 8.

* * * * *